United States Patent Office 3,483,612
Patented Dec. 16, 1969

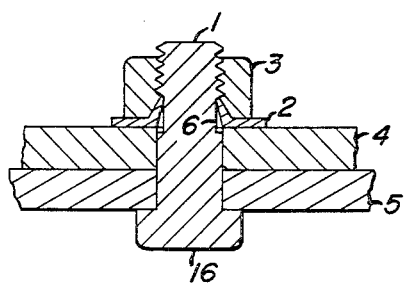
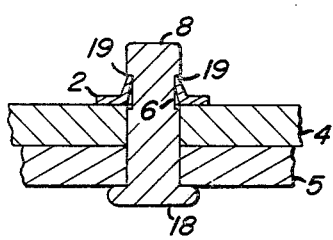
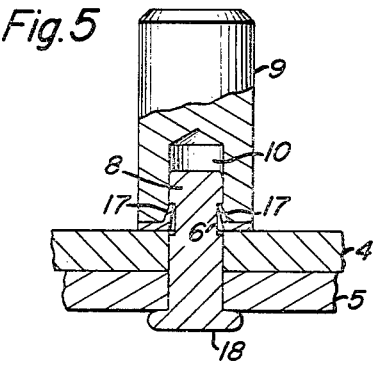
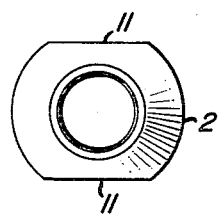
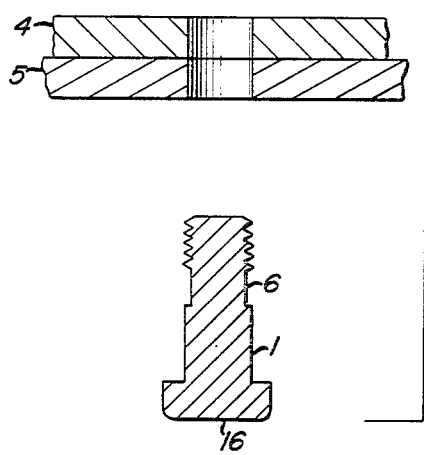
INVENTOR.
Bernhard Rogge

3,483,612
FASTENER—SELF-LOCKING
Bernhard Rogge, Cherry Hill Road,
Baldwin, Md. 21013
Filed Feb. 5, 1968, Ser. No. 702,987
Int. Cl. F16b 39/00
U.S. Cl. 29—520          6 Claims

ABSTRACT OF THE DISCLOSURE

A fastener means comprising a first connection member and a second member washer means, said first member being undercut to a predetermined height to suit the design of the structure to be assembled, said second member being deformed from a flat configuration to act as a spring and load determining member.

DEDICATORY CLAUSE

The invention described herein may be manufactured used, and licensed by or for the Government for governmental purposes without the payment to me of any royalty thereon.

SPECIFICATION

My invention relates to a new fastening means to assemble various structures and to provide positive fastening and proper tension.

In all of the prior art fasteners, such as nuts and bolts and the like, a given amount of torque is required to assure the proper tension of the fastening means in order to provide the necessary clamping or holding action. For example, it is necessary to tighten a nut on a bolt with a torque wrench to obtain the necessary degree of tension to hold the assembly together. Different surface conditions of mating assemblies, such as dry or lubricated surfaces, caused a need to vary the amount of torque from item to item. Such conditions created the problem of difficulty to establish consistent tension load in various fasteners. This inability to establish consistent tenison load frequently resulted in the loss of a nut from a bolt; for example, due to vibration and other forces which, of course, resulted in the failure of the entire assembly. Another problem presented by prior art fasteners, such as frictional interference type nuts and bolts, was the considerable amount of work and difficulty in assembly. A further problem presented by prior art fasteners, such as deformed nuts, was the expense involved in the time and effort to make an assembly, particularly in field installations.

A principal object of my invention is to provide a fastening means which will produce a reliable, constant, equal, and reproducible tensile load regardless of any wrench torque applied.

A further object of my invention is to provide a fastening means which is economical and easily assembled.

Other objects of my invention will be obvious or will appear from the specification hereinafter set forth.

FIGURE 1 is a vertical section through my fastener assembly.

FIGURE 2 is an exploded view of FIGURE 1 prior to compression of the washer means.

FIGURE 3 is an alternate design of FIGURE 1 utilizing a stud in place of the FIGURE 1 bolt.

FIGURE 4 is a plan view of the washer shown at 4—4 in FIGURE 2 but having flat sides rather than the annular configuration of FIGURE 2.

FIGURE 5 is a view showing the tool and method of asembly of the structure shown in FIGURE 3.

My invention and FIGURES 1 to 5 will now be described in detail as follows:

FIGURE 1 shows two metal structures 4 and 5 being assembled together by the fastener which constitutes my invention. In this figure, a bolt 1 which serves at the structures connection member and nut 3 are shown to demonstrate by invention. Bolt 1 is undercut at 6 from below the thread nearest the bolt head to a point at or slightly below the surface of member 4. Nut 3 is countersunk at 7, as shown in FIGURE 2, to the configuration to fit washer 2. Washer 2 is deformed by means of a stamping operation to a spherical configuration prior to assembly as shown in FIGURE 2. This deformation results in surfaces 12 of washer 2 being beveled in relation to surface 13, surfaces 14 being in a plane perpendicular to the plane of surface 13, and surfaces 15 drawn to a taper. The taper in washer 2 is drawn to a configuration as to match the taper in nut 3 caused by the countersinking operation on the nut. Bolt 1 is inserted in the members to be assembled, such as structures 4 and 5 in the exploded view of FIGURE 2, and washer 2 and nut 3 inserted thereon as shown in FIGURE 2. Upon drawing nut 3 tight on bolt 1, surfaces 15 of washer 2 are caused to seat within the mating taper of nut 3 and bear on bolt 1 in recess 6 and lock below the thread nearest head 16. With this mode of assembly, bolt 1 would be held in place by washer 2 and structures 4 and 5 would remain assembled even if nut 3 were to vibrate loose or be completely removed. In order that the washer hold the bolt in position even though the nut is loosened or removed, washer 2 should be of any metal which readily yields and remains in a deformed but rigid position after deformation. If desired to make bolt 1 readily removable, if necessary, washer 2 should be made of such material and heat treated to produce a spring type washer that on release from the compressive force imparted by nut 3, washer 2 will return to its original shape as shown in FIGURE 2, and release bolt 1.

FIGURE 3 demonstrates the utility of my invention as described above, with pins. Pin 8 in FIGURE 3 being substituted for bolt 1 in FIGURE 1. The mode of assembly where a pin is utilized is shown in FIGURE 5. This mode of assembly requires a special tool 9 having a recess 10 which fits over the end of pin 8 opposite head 18. Surfaces 17 of tool 9 are tapered to mate washer 2 surfaces 15 in the same manner as nut 3 was tapered; by countersinking. Tool 9 is inserted over pin 8 after assembly through structures 4 and 5 and the insertion of washer 2 over pin 8. Tool 9 is then struck by a hammer manually or pressed by a hydraulic press on a production line and washer 2 surfaces 15 are caused to seat within the mating taper of tool 9 and bear on pin 8 in recess 6 and lock below shoulders 19 in the same manner as described regarding the bolt and nut above.

The washer design shown in FIGURE 4 is utilized to enable placing an open end wrench in engagement with the flat surfaces of the washer to facilitate disengaging the assembly if necessary.

It is obvious that other modifications can be made of my invention.

I claim:

1. A fastener means for assembling structures comprising a structure connection member including a head and external threads, washer means to insert on said connection member, and means to place said washer under compression and superimposed on said washer; said connection member being undercut to a height determined by the thickness of the structures being assembled and said means to place the washer under compression being a nut having the hole countersunk on the side of the nut which abuts the washer means to provide a female taper means to mate with a male taper portion on the washer means; said washer means and having a male tapered portion superimposed on a beveled surface portion, said washer means being adapted to have the tapered portion deformed from the vertical position toward the structure connection member; said compression means being provided to exert a downward thrust on said washer and force the male tapered portion of said washer into said undercut of said connection member and provide a locking relation between said connection member and said washer.

2. The fastener means of claim 1 wherein the washer is made of a metal which readily deforms and remains in a deformed but rigid position after deformation.

3. The fastener means of claim 1 wherein the washer is made of a metal and is heat treated to produce a spring type washer capable of return to its original shape upon release of the compression induced by said compression means provided to deform said washer.

4. A method of assembling two or more structures together comprising the steps of providing holes in said structures; superimposing said holes over each other; providing a connection member having a head member larger than the diameter of said holes and having an undercut portion determined by the thickness of said structures and having external screw threads; inserting said connection member through said holes; inserting a washer means on said connection member, said washer means having a male tapered portion superimposed on a beveled surface portion, said washer means adapted to have the tapered portion deformed from the vertical position toward said connection member; applying compression means to compress said washer and to force said male tapered portion into said connection member undercut portion thereby locking said connection member within said structures and maintaining said structures in an assembled mode, said compression means being a nut having the hole countersunk on the side of the nut which abuts the washer means to provide a female taper means to mate with the male taper portion, said nut engaging the threads on said connection member.

5. The method of claim 4 wherein the washer is made of a metal which readily deforms and remains in a deformed but rigid position under deformation.

6. The method of claim 4 wherein the washer is made of a metal and is heat treated to produce a spring type washer capable of return to its original shape upon release of the compression induced by said compression means.

References Cited

UNITED STATES PATENTS

| 1,720,799 | 7/1929 | McLaughlin | 151—14.5 |
| 2,492,115 | 12/1949 | Crowther | 151—69 |
| 2,506,953 | 5/1950 | Dzus | 151—69 |
| 2,689,146 | 9/1954 | Werner | 85—36 |
| 3,118,718 | 1/1964 | Babey | 151—69 |

FOREIGN PATENTS 566,446  12/1944  Great Britain.

EDWARD C. ALLEN, Primary Examiner

U.S. Cl. X.R.

29—526; 85—8.6, 8.8; 151—69